C. T. SCHOEN.
RESILIENT TIRE.
APPLICATION FILED JUNE 29, 1911.
1,040,432.
Patented Oct. 8, 1912.
2 SHEETS—SHEET 2.
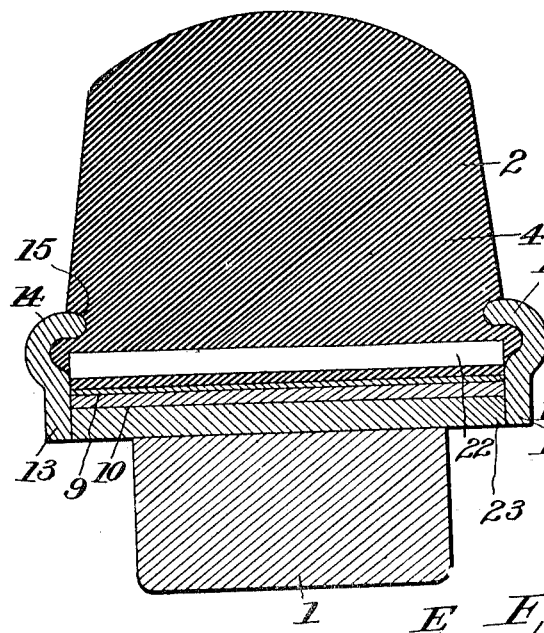
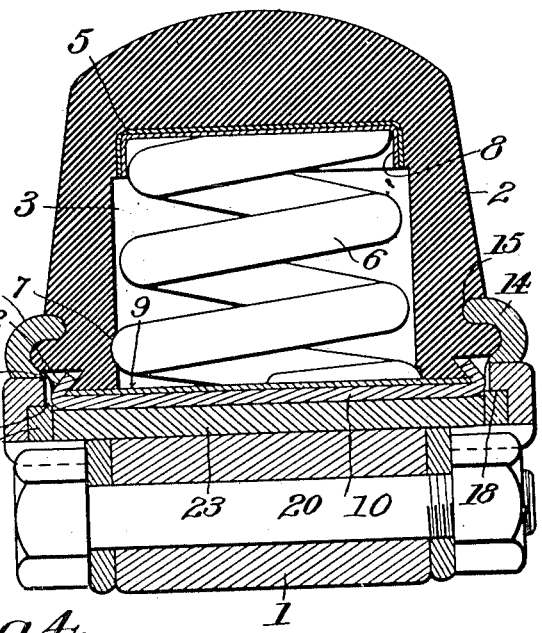
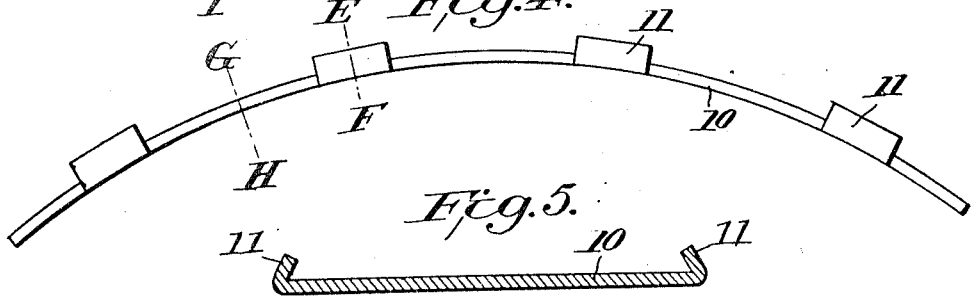
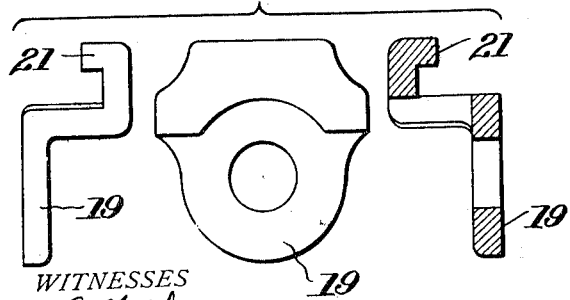
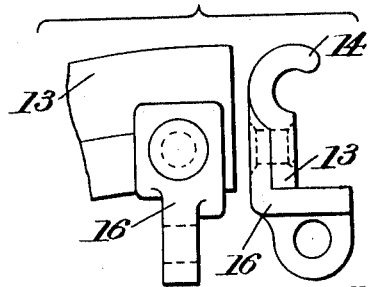
WITNESSES
INVENTOR
Charles T. Schoen
by Wm. H. Fussel, Attorney

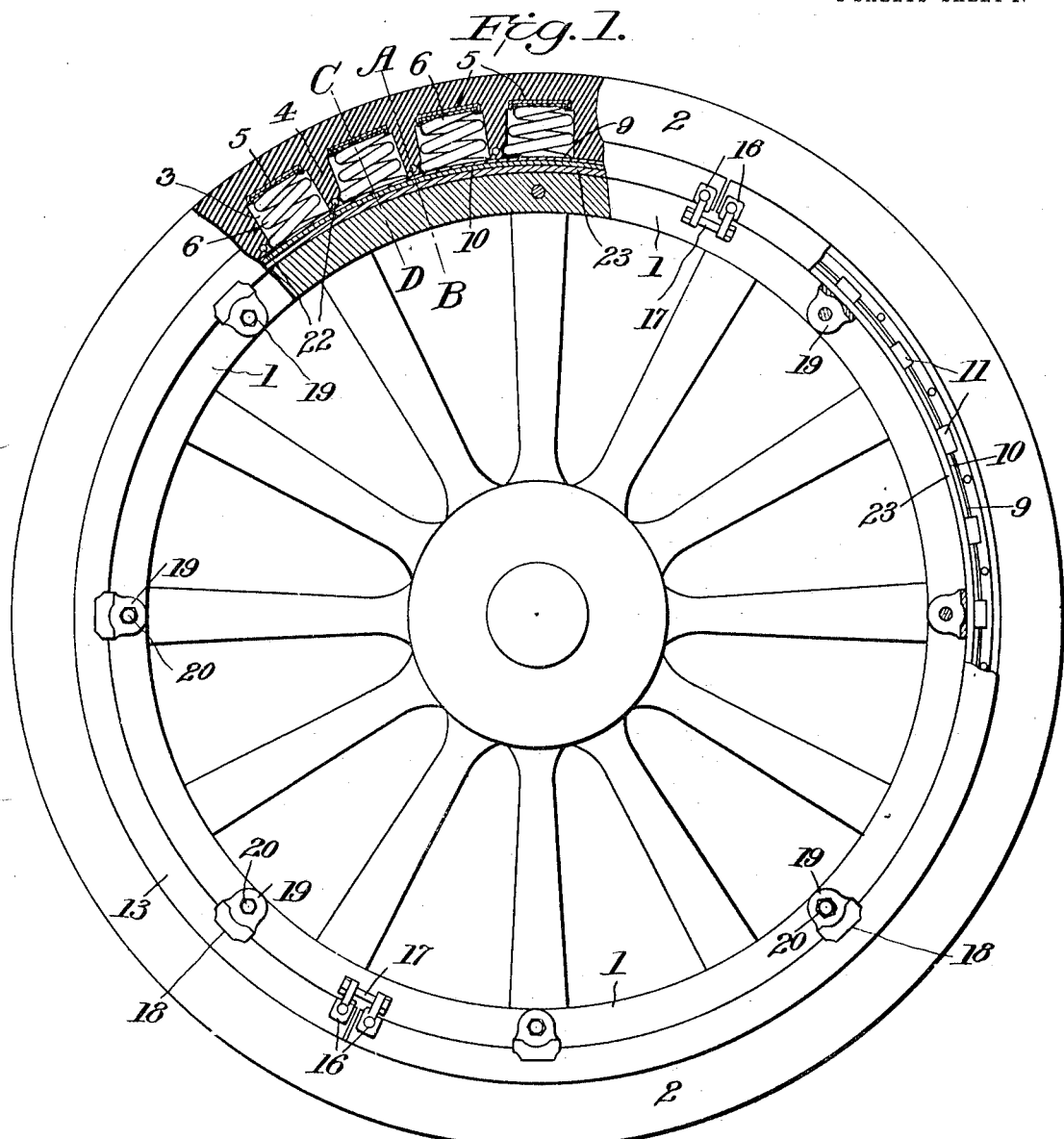
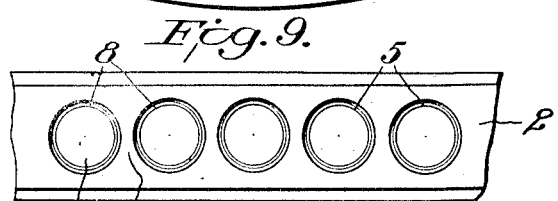

UNITED STATES PATENT OFFICE.

CHARLES T. SCHOEN, OF MEDIA, PENNSYLVANIA.

RESILIENT TIRE.

1,040,432.   Specification of Letters Patent.   Patented Oct. 8, 1912.

Application filed June 29, 1911. Serial No. 636,083.

*To all whom it may concern:*

Be it known that I, CHARLES T. SCHOEN, a citizen of the United States, residing at Media, in the county of Delaware and State of Pennsylvania, have invented a certain new and useful Improvement in Resilient Tires, of which the following is a full, clear, and exact description.

The object of this invention is to produce a resilient tire for the wheels of motor and other vehicles, which will be a practical and serviceable substitute for pneumatic tires, and which will not be subject to the dangers and expense of punctures, deflation and the other vexatious and costly objections to which pneumatic tires are exposed.

I am aware, of course, that many forms of resilient tires, other than pneumatic, have been devised, in which the tread surface or casing is of rubber or rubber compound, combined with metal springs, but so far as I am aware, it is original with me to provide such a casing with spring pockets in which metal springs are secured, and the casing secured to the rim of the wheel and the springs retained in the casing by sectional bands and clips.

Having thus stated the principle of my invention, I will proceed now to explain the same and then will particularly point out and distinctly claim the part, combination or improvement which I claim as my invention.

In the accompanying drawings illustrating the invention, in the several figures of which like parts are similarly designated, Figure 1 is an elevation and partial section of a wheel with my tire in place thereon. Fig. 2 is a cross-section, on a larger scale, taken on line A B, Fig. 1. Fig. 3 is a cross-section, on a larger scale, taken on line C D, Fig. 1. Fig. 4 is a side elevation, and Figs. 5 and 6 are cross-sections on lines E F and G H, respectively, Fig. 4, of one of the sections of the sectional base band. Fig. 7 shows in side view, front elevation and longitudinal section one of the clips. Fig. 8 shows in front and side elevations the clenching band and clamp. Fig. 9 is an inside plan view of a portion of the casing, and Fig. 10 is a side elevation of the same.

The wheel may be of ordinary construction and provided with a wooden or other rim, 1.

The tire comprises a casing 2, of rubber or rubber compound or other resilient material or composition, such as is used for cushion or resilient as distinguished from pneumatic tires. Within this casing are molded the pockets 3, of substantially cylindrical outline and separated from one another by intervening walls 4 of the full depth and width of the casing. Each pocket is provided with a metal cap 5 fitted in a shouldered recess at the bottom of the pocket and a tapering coiled spring 6. The casing adjacent to the entrances to the pockets 3 may be and preferably is provided with a spiral groove 7 into which the adjacent or bottom convolution of the spring is forced so as to render the spring stable within the pocket; and the other end convolution of the spring is adapted to fit tightly within the cap 5, the intermediate convolutions of the spring being out of contact with the walls of the pocket, as clearly shown in Fig. 3. In order to avoid chattering and noise in the event the spring should settle or fail to fit tightly within the pocket, I provide the cap with a lining of cotton-duck, felt, or other suitable material 8, and I also interpose a similar lining strip 9 at the other end of the spring.

The base band 10 of metal is placed around the casing on the inside, and this band, as shown more particularly in Fig. 4, is made up of a number of sections and these sections are provided with ears 11 bent toward each other and adapted to fit in preformed cavities 12 made in the sides of the casing in transverse alinement with the pockets 3, these preformed cavities being of substantially the same size as the ears 11 so that these ears not only grasp the casing transversely to hold the band in place when the casing is removed from the rim, but also engage it longitudinally and thereby prevent motion or creeping of the casing in both directions. The base band is made in sections so as to facilitate its assembling, and more particularly to facilitate access to the springs in case any of them become damaged, it being unnecessary to remove the whole band in order to gain access to any particular spring. The casing thus equipped with springs and base bands is applied to the rim 1 of the wheel and secured thereto by means of the sectional bands 13, which, as shown in Figs. 2, 3 and 8, have the flanged edges 14 which enter grooves 15 in the sides of the casing; and these sections have at adjacent ends the clamping brackets 16 riveted or otherwise securely fastened to them and connected by bolts 17, so that the sections may be drawn tightly together. These band sections are provided at intervals with slots 18 and these slots are engaged by clips 19 which are secured to the rim by bolts 20. Lips 21 on these clips 19 enter the slots 18 in the band sections in order to hold them in place and also to hold them against longitudinal movement.

The walls 4 have embedded in them transversely at their inner edges, metal rods or bars 22 which serve to reinforce these walls and prevent them from puckering where they engage the base band 10.

As shown more particularly in Figs. 1, 2 and 3, the rim 1 of the wheel is made of wood and preferably has a metal tire 23 surrounding it, and the resilient tire is placed upon this metal tire instead of directly upon the wooden rim; although the invention is not limited to the use of any particular construction of wheel rim.

The springs are designed to practically fill the pockets so as to support the casing both transversely and longitudinally, and the invention is not limited to the employment of tapered springs, although preference is had for tapered springs, especially as the common practice is to make the ordinary cushion or solid tire tapering in cross-section.

By the construction described, allowance is made for variations in the rim of the wheel, and it is possible to compensate for such variations in wear.

It is to be understood that while I have herein shown and described the best mode in which I have contemplated applying the principle of my invention, I wish not to be understood as limiting my invention or the claims therefor herein made to mere details of construction and arrangement, since these may be varied to suit the conditions under which the invention is used.

What I claim is:—

1. A resilient tire for vehicle wheels, having a resilient casing provided with integral individual open-ended cylindrical pockets having grooves in their walls adjacent to the open ends thereof, a tapering coil spring arranged in each of said pockets and having its smaller end engaging the bottom of the pocket and its larger terminal convolution engaging the groove at the opening in the pocket, and a band applied to the casing and covering said openings to hold the springs in place and adapt the casing for the application to a wheel.

2. A resilient tire for vehicle wheels, having a resilient casing provided with integral individual cylindrical pockets having a shouldered recess in their bottoms and a groove in their walls adjacent to the entrances thereto, a tapering coiled spring arranged in each of said pockets having its smaller end fitted in the shouldered recess at the bottom of its pocket and its larger end engaging the groove at the entrance to the pocket, and a band applied to the casing to hold the springs in place and adapt the casing for the application to a wheel.

3. A resilient tire for vehicle wheels, having a casing provided with integral individual cylindrical pockets having a reduced portion in their bottoms and grooves in their walls adjacent to the entrances thereto, a tapering coiled spring arranged in each of said pockets having its smaller end fitted in the reduced portion at the bottom of its pocket and its larger end engaging the groove at the entrance to the pocket, and its intermediate convolutions out of contact with the walls of the pocket, and a band applied to the casing to hold the springs in place and adapt the casing for application to a wheel.

4. A resilient tire for vehicle wheels, having a casing provided with pockets, coiled springs mounted in said pockets, a sectional metallic base band applied to and carried by the casing for covering said pockets and holding said springs in place when the casing is removed from the wheel, spaced ears on said base band, and spaced cavities in the sides of the casing in transverse alinement with the pockets to receive said ears to hold the sections of said band in place upon the casing and prevent creeping of the casing, and means for fastening the tire to the rim of a wheel.

In testimony whereof I have hereunto set my hand this 28th day of June, A. D., 1911.

CHARLES T. SCHOEN.

Witnesses:
M. B. JACKSON,
ROBERT I. SMITH.